Sept. 13, 1932.    T. G. NYBORG ET AL    1,877,194
BELT DRIVE
Filed April 4, 1930

INVENTORS
TAGE GEORG NYBORG,
MARK FREDERICK HIGGINS,
BY
ATTORNEYS

Patented Sept. 13, 1932

1,877,194

UNITED STATES PATENT OFFICE

TAGE GEORG NYBORG AND MARK FREDERICK HIGGINS, OF WORCESTER, ENGLAND

BELT DRIVE

Application filed April 4, 1930, Serial No. 441,458, and in Great Britain May 16, 1929.

This invention relates to belt drives, and more particularly to belt conveyors wherein an endless belt or band is employed in conjunction with suitable driving drums or pulleys, and wherein means are provided for increasing the frictional contact between the drum or pulley and the belt on the slack side thereof, such means comprising a jockey pulley rotatably mounted at one end of a member, the opposite end of which is pivotally secured to a fixed part of the apparatus, the said pulley being held in frictional contact with the driving belt by means of a spring.
According to the specification of our copending application filed February 13th, 1929, Serial No. 339,568 we provide a belt drum of the above type comprising a driving or supporting drum, a jockey pulley, means for pivotally supporting the jockey pulley, spring operated means whereby the jockey pulley is maintained in contact with the belt or band on the slack side of the driving or supporting drum, characterized by the feature that the axis of the said spring is approximately in a plane containing the axis of the jockey pulley, one end of the said spring being supported against a fixed abutment.

With the above arrangement it has been found that if the belt breaks so that the slack end of the belt is not pulled away from the driving drum it is possible for the belt to pile up inside the driving head and thereby put a heavy strain upon the motor or other driving means and the head itself, while at the same time causing injury to the belt due to the heavy pressure due to this piling.

The object of the present invention is to provide means whereby the above defects may be avoided, and the invention consists in a belt drive comprising a driving or supporting drum, a jockey pulley, a member pivotally supporting the jockey pulley, spring operated means whereby the jockey pulley is maintained in contact with the belt or band on the slack side of the driving or supporting drum, the said spring being approximately in a plane containing the axis of the jockey pulley, a fixed abutment for supporting one end of the said spring and means whereby in the event of breakage occurring in the pulley or band, the jockey pulley is forced out of contact with the driving drum against the action of the said spring.

Our invention will now be described with reference to the accompanying drawing in which:—

Figure 1:
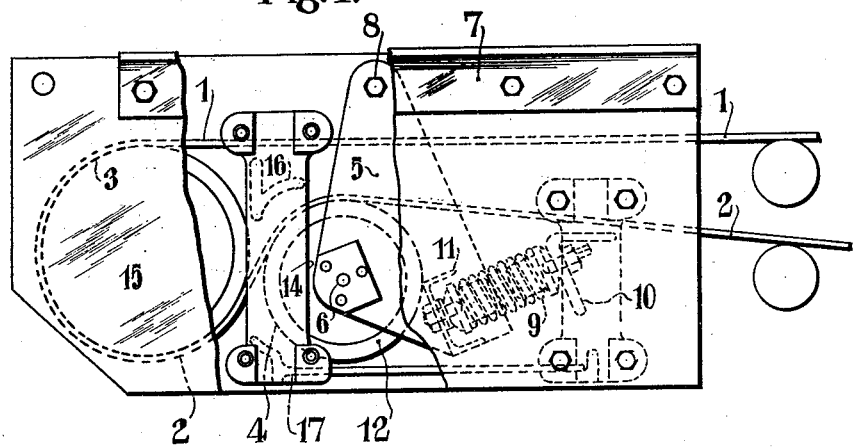
Fig. 1 shows our device applied to a single drum head of a belt or band conveyor, and in its normal operative position, parts being broken away for clearness.

Referring now to the drawing wherein like reference numerals indicate like parts.

An endless conveyor having an upper driving belt or band 1 and a lower or return belt or band 2 is adapted to pass over a drum 3 and held in contact therewith over a greater part of its peripheral surface by means of a jockey pulley 4 rotatably mounted upon brackets 5 by means of a spindle 6, the said brackets being each in turn pivotally mounted upon the side plates 7 of the conveyor by means of studs 8, the side plates of the conveyor being held together by stays where necessary. The jockey pulley 4 is held in intimate contact with the return part of the driving band or belt by means of a spring 9 mounted between a fixed abutment 10 and a member 11 provided upon the brackets, the arrangement being such that the return part of the band or belt is brought into contact with the greater portion of the peripheral surface of the supporting drum 3.

The jockey pulley 4 is provided upon its outer periphery with a lagging or thick rubber coating 12, the thickness and pliability of the rubber being such as to permit of the passage of hinges or other arrangement which may be provided in the belt or band, while at the same time the action of the spring 9 will be such as to secure a large pressure contact between the jockey pulley 4 and the belt or band 1 and drum 3.

Figure 2:
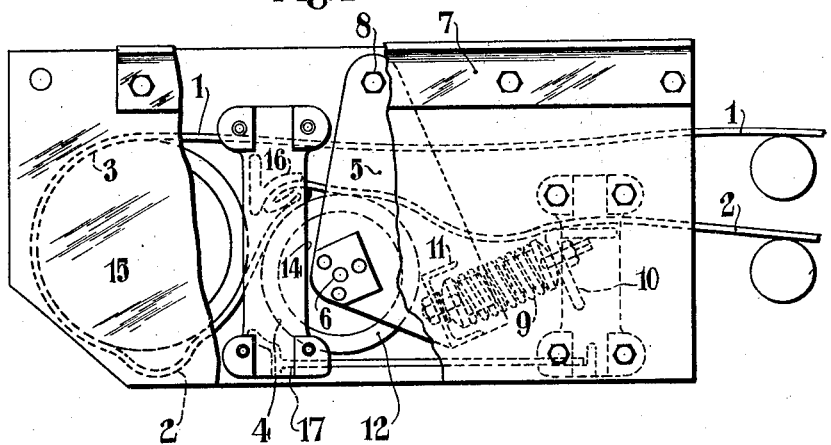
Fig. 2 is a view of the arrangement shown in Fig. 1 with the device operating with a broken belt.

Brackets 14 located on each side of the side plates 15 are provided with an upper transversely disposed shield or abutment 16 and a lower transverse member 17, the arrangement being such that should the belt or band 2 break, the said belt or band piles up under the transverse shield 16 (see Fig. 2) thereby forcing the pivoted brackets 5 back against the spring, thus allowing the driving drum 3 to continue revolving without paying off more belting.

We wish it to be understood that the invention is not to be limited to the precise form or location of the shield and its supporting brackets but that various modifications may be made and mechanical equivalents employed within the scope of the invention.

What we claim and desire to secure by Letters Patent is:—

1. A belt drive, comprising a drum, a jockey pulley, a member pivotally supporting the jockey pulley, spring operated means adapted to maintain the jockey pulley in contact with the belt on the slack side of the drum, a fixed abutment for supporting one end of the spring and a fixed transverse shield in spaced relation to the jockey pulley, between which and the face of the jockey pulley the belt is adapted to pass whereby in the event of a breakage occurring in the belt the belt will pile up between the shield and the jockey pulley to force the jockey pulley out of contact with the drum against the action of the said spring.

2. A belt drive, comprising a drum, a jockey pulley, a member pivotally supporting the jockey pulley, spring operated means adapted to maintain the jockey pulley in contact with the belt on the slack side of the drum, a fixed abutment for supporting one end of the spring, two fixed side plates between which the parts are located, and a shield transversely disposed between the two side plates and bridging them, between which and the face of the jockey pulley the belt is adapted to pass whereby in the event of a breakage occurring in the belt the belt will pile up between the shield and the jockey pulley to force the said jockey pulley out of contact with the drum against the action of the said spring.

3. A belt drive, comprising a drum, a jockey pulley, a member pivotally supporting the jockey pulley, spring operated means adapted to maintain the jockey pulley in contact with the belt on the slack side of the drum, a fixed abutment for supporting one end of the spring, two fixed side plates between which the parts are located, and a shield transversely disposed between the two side plates and bridging them, having a concave inner face, and between the concave face of which and the face of the jockey pulley the belt is adapted to pass, whereby in the event of a breakage occurring in the belt the belt will pile up between the shield and the jockey pulley to force the jockey pulley out of contact with the drum against the action of the said spring.

In testimony whereof, we affix our signatures.

TAGE GEORG NYBORG.
MARK FREDERICK HIGGINS.